Feb. 2, 1954
F. H. GJESDAHL
2,667,708
SNOWPLOW AND MEANS FOR COUPLING
THE SAME TO PUSHER TRUCKS
Filed Aug. 25, 1950
4 Sheets-Sheet 1
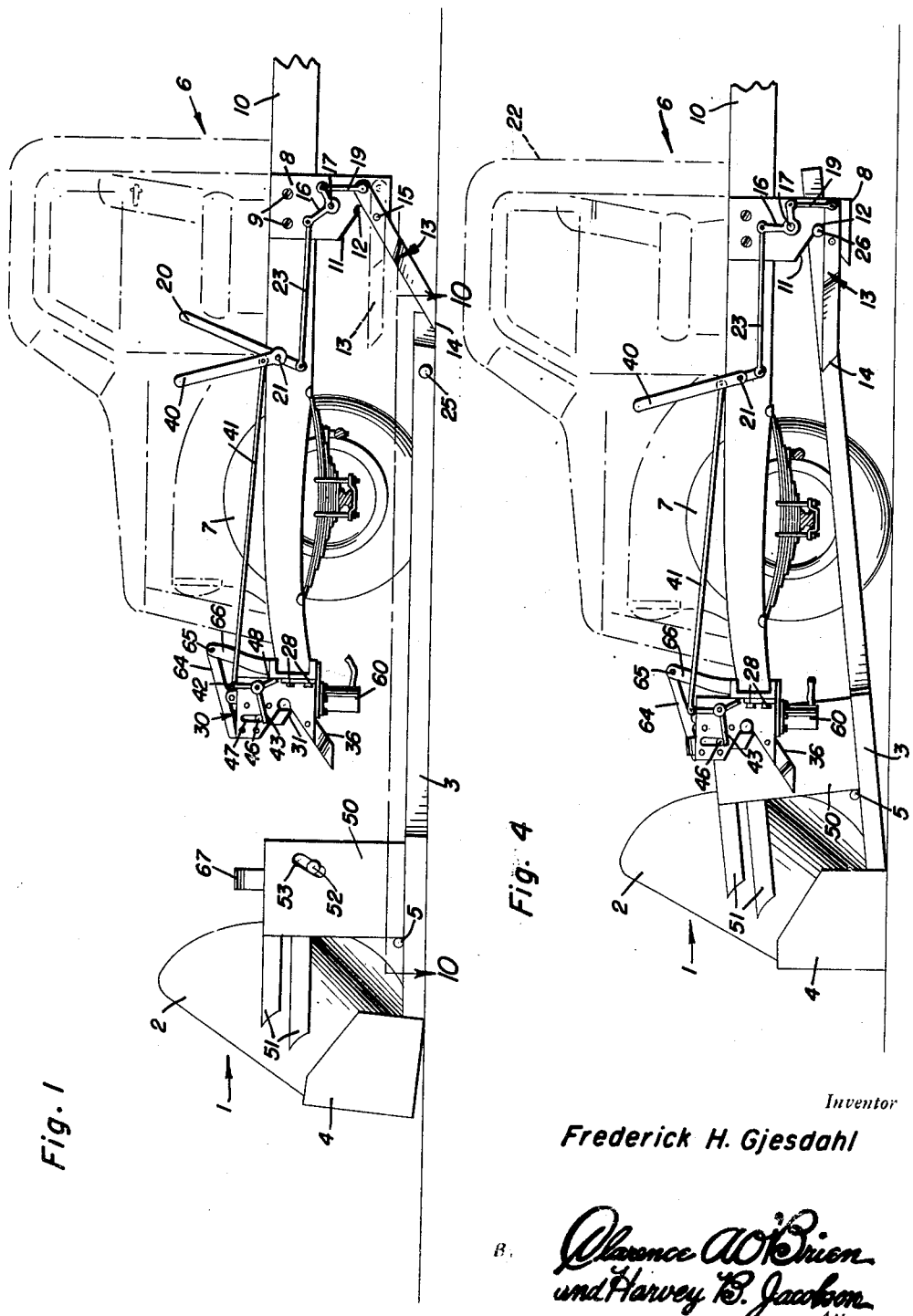
Inventor
Frederick H. Gjesdahl
By Clarence A. O'Brien
and Harvey B. Jacobson
Attorneys

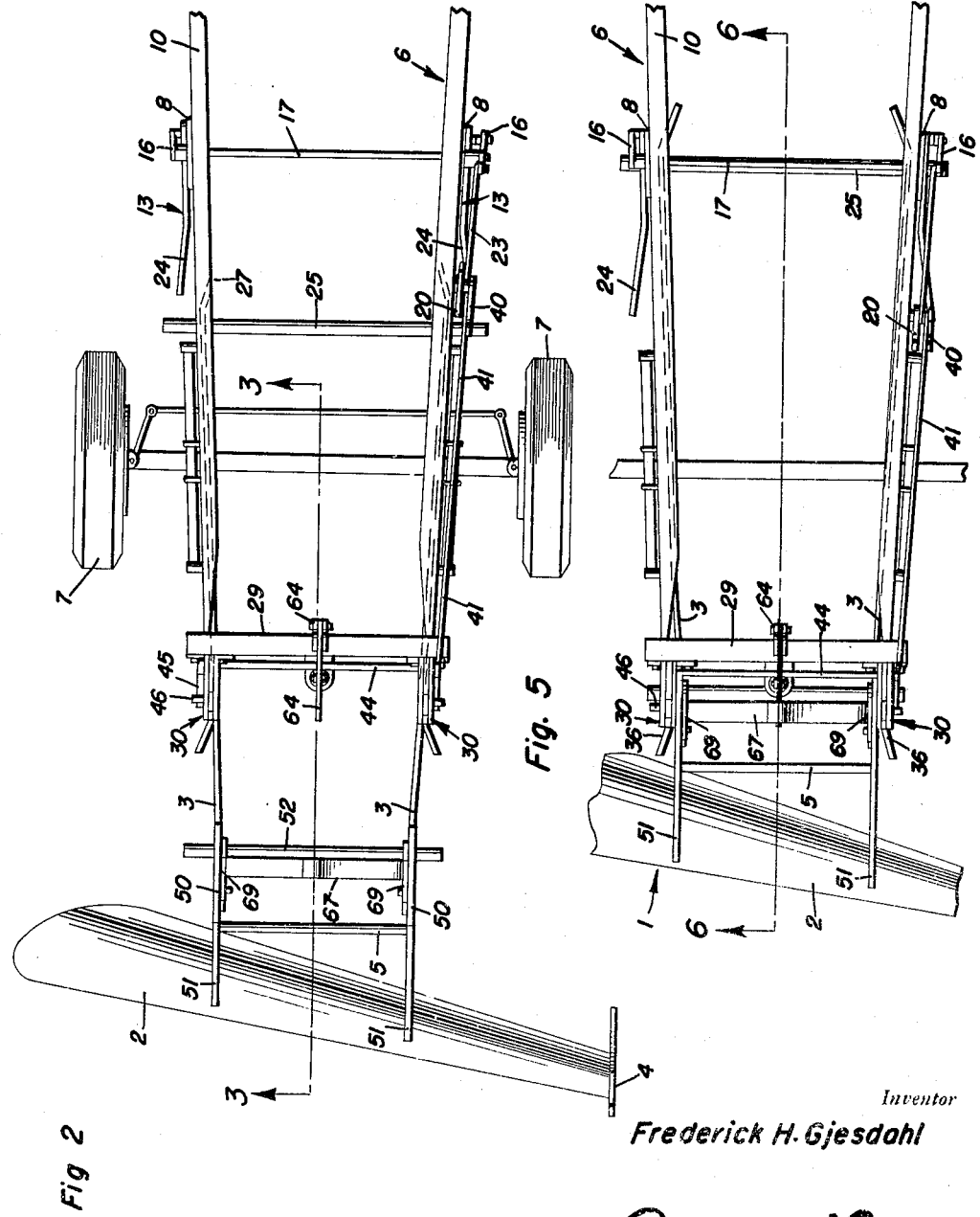

Feb. 2, 1954
F. H. GJESDAHL
2,667,708
SNOWPLOW AND MEANS FOR COUPLING
THE SAME TO PUSHER TRUCKS
Filed Aug. 25, 1950
4 Sheets-Sheet 3
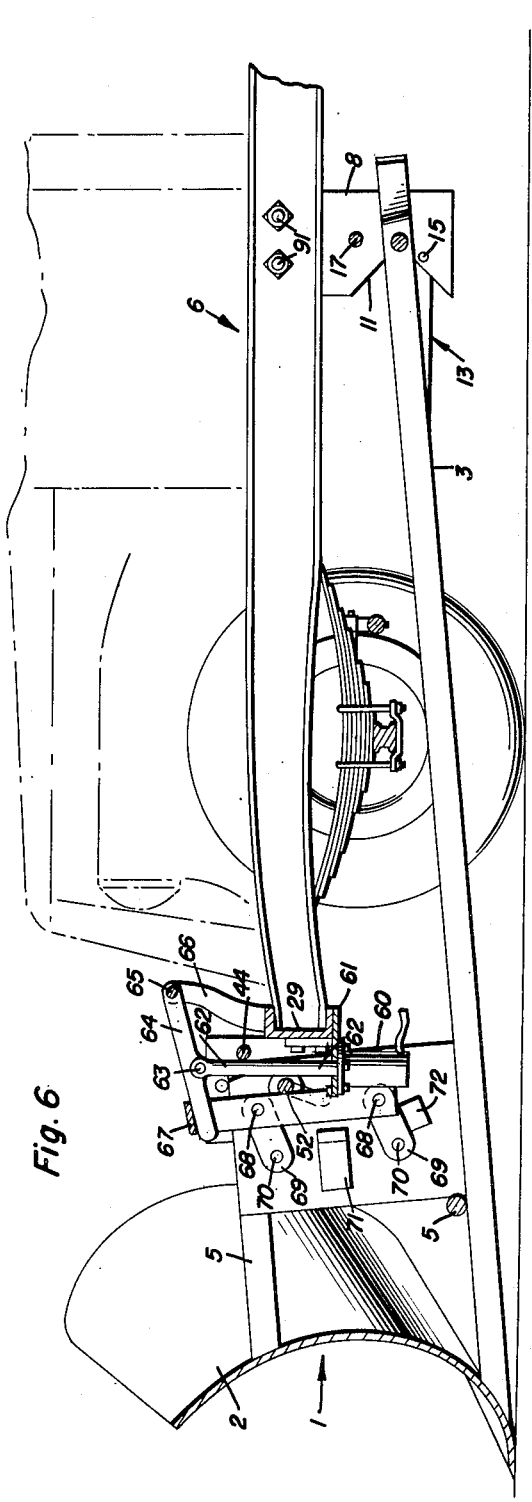
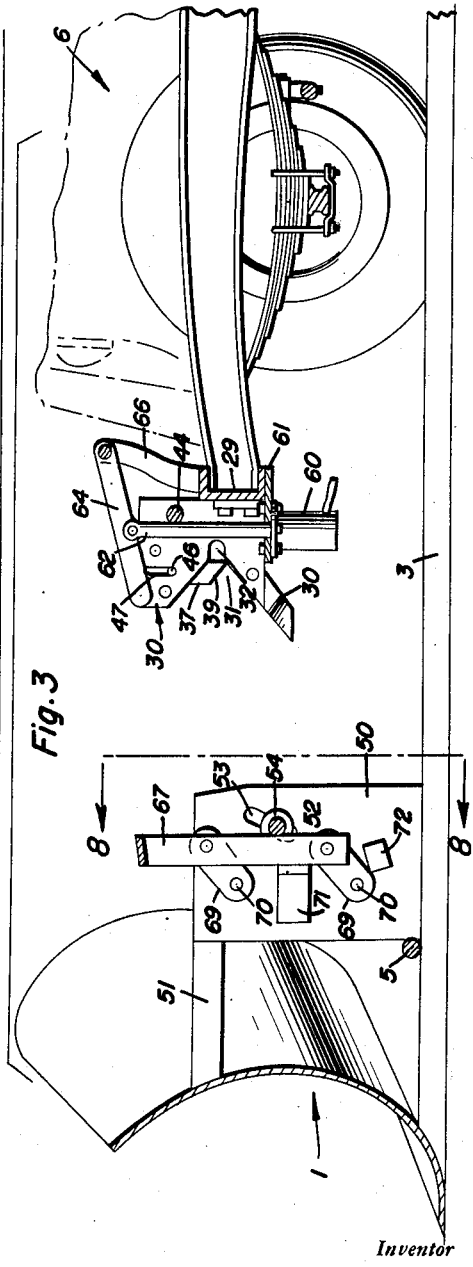
Inventor
Frederick H. Gjesdahl
By *Clarence A. O'Brien*
and *Harvey B. Jacobson*
Attorneys

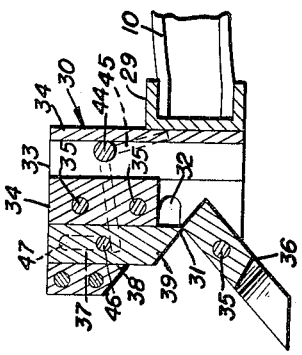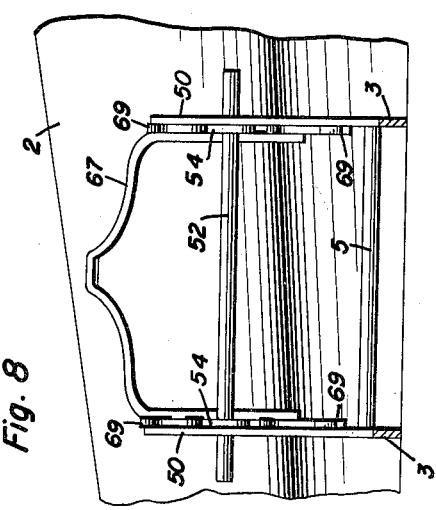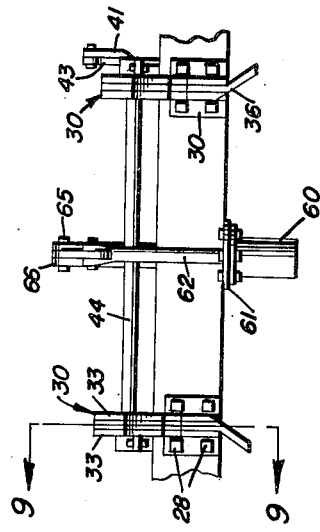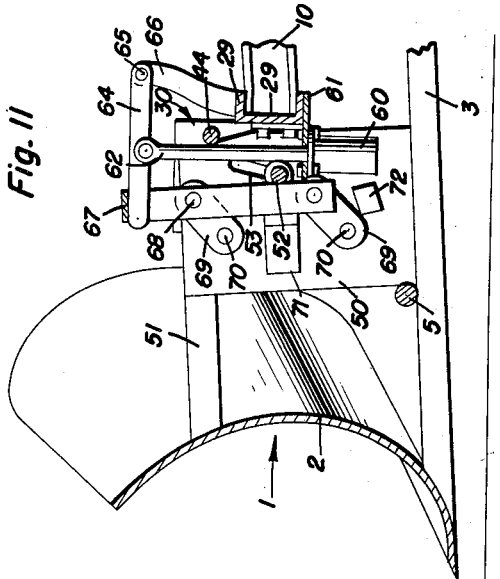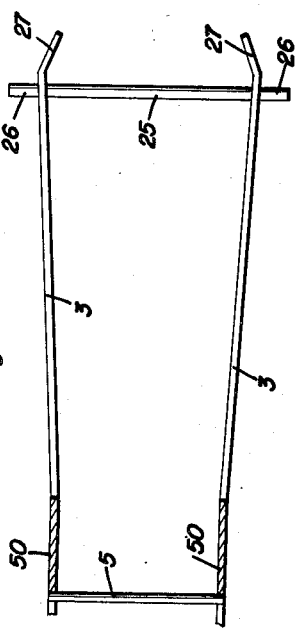

Patented Feb. 2, 1954

2,667,708

UNITED STATES PATENT OFFICE 2,667,708

SNOWPLOW AND MEANS FOR COUPLING THE SAME TO PUSHER TRUCKS

Frederick H. Gjesdahl, Crookston, Minn.

Application August 25, 1950, Serial No. 181,444

4 Claims. (Cl. 37—42)

My invention relates to improvements in snow plows, and to means for coupling the same to an automotive truck for pushing thereby.

The primary object of my invention is to provide for coupling a grounded snow plow to an automotive pusher truck by forward travel of the truck relative to the grounded snow plow, and uncoupling the snow plow from said truck by backing of the truck relative to the snow plow, all without the driver of the truck leaving his seat in the truck cab.

The foregoing and ancillary objects are attained by the means set forth in the following description, illustrated in the accompanying drawings and defined in the claims appended hereto.

In said drawings:

Figure 1 is a fragmentary view in side elevation of my invention in the preferred embodiment thereof and illustrating the snow plow grounded and the pusher truck positioned for forward driving relative thereto for coupling the snow plow to the truck;

Figure 2 is a view in plan of the same;

Figure 3 is a view in longitudinal vertical section taken on the line 3—3 of Figure 1 and drawn to a larger scale;

Figure 4 is a fragmentary view in side elevation illustrating the snow plow coupled to the pusher truck;

Figure 5 is a view in plan of the same;

Figure 6 is a view in longitudinal vertical section taken on the line 6—6 of Figure 5 and drawn to a larger scale;

Figure 7 is a fragmentary view in front end elevation of the chassis frame of the pusher truck, the hanger brackets on the front end of the chassis frame and parts associated therewith, and the power lift cylinder, piston rod and lift lever at the front end of the chassis frame;

Figure 8 is a view in vertical transverse section taken on the line 8—8 of Figure 3;

Figure 9 is a view in vertical section taken on the line 9—9 of Figure 7 and drawn to a larger scale;

Figure 10 is a detail view in horizontal section taken on the line 10—10 of Figure 1; and Figure 11 is a fragmentary view in vertical longitudinal section taken on the same line of Figure 5 as Figure 6 and drawn to a larger scale with the power lift means supporting the front end of the snow plow in lifted position.

Referring to the drawings by numerals, according to my invention, a snow plow 1 is provided comprising a moldboard 2 supported in upright position by and suitably fixed at its lower longitudinal edge on the front ends of a pair of opposite horizontal side pusher bars 3 across which said moldboard 2 extends diagonally, as is usual. A fender plate 4 is suitably fixed on the foremost end of the mold board 2, and a cross tie rod 5 connects said pusher bars 3 together immediately behind said moldboard 2. The side pusher bars 3 are spaced apart so that when the same are resting on the ground to ground the snow plow, as when said snow plow is not in use, the conventional automotive truck 6 may be driven forwardly over said pusher bars 3 with the front wheels 7 of said truck straddling the pusher bars 3 of the pair.

Means are provided on the truck 1 in the rear of the front wheels 7, and also means on the pusher bars 3 adjacent the rear ends thereof coacting to pick-up the rear ends of said pusher bars off the ground and couple the same to said truck 6 in suspended position when said truck 6 is driven forwardly, as above described. These means will now be described in the order named.

A pair of opposite hanger bracket plates 8 are bolted, as at 9, to opposite sides of the chassis frame 10 of the pusher truck 6 to depend therefrom at a suitable location in the rear of the front wheels 7, and which are spaced apart further than the rear ends of said pusher bars 3 to accommodate said ends therebetween. The hanger bracket plates 8 are each formed with a lower front edge V-notch 11 opening forwardly and having a semi-circular apex socket 12 therein. A pair of pick-up bars 13 with front beveled edges 14 are pivoted, as at 15 to the outer sides of the hanger bracket plates 8 below and forwardly of the sockets 12 for vertical swinging movement and to extend forwardly of said plates. The pick-up bars 13 are swingable in unison into downwardly and forwardly inclined positions with their beveled edges 14 riding on the ground and by means of a pair of cranks 16 at the outer sides of the hanger bracket plates 8 fast on opposite ends of a rock shaft 17 journaled in said plates 8 above the notches 11 and connected by pivoted links 19 to rear ends of said pick-up bars 13.

A hand lever 20 pivoted, as at 21, on one side of the chassis frame 10 within easy reach of a driver in the truck cab 22 is connected by a pivoted link 23 to one crank 16 for rocking said rock shaft 17 to swing said pick-up bars 13 into the described pick-up position thereof. As will be apparent, the pick-up bars 13 are spaced apart to straddle the pair of pusher bars 3, and to facilitate forward movement of said bars 13 into straddling relation to the rear ends of said pusher bars 3, the front ends of said pick-up bars 13 slant outwardly, laterally, as best shown at 24 in Figures 2 and 5.

The means on the rear ends of the pusher bars 3 coacting with the means described in the immediately preceding paragraph comprises a cross pusher rod 25 connecting said pusher bars 3 adjacent said rear ends thereof with trunnion ends 26 extending outwardly of the sides of said pusher bars 3, and rear end cam portions 27 on said pusher bars 3 converging rearwardly, relatively, to facilitate movement of said ends between the hanger bracket plates 8.

Means are provided on the front end of the pusher truck 6 coacting with front end means on the pusher bars 3 to couple said bars and the front end of the snow plow 1, to the front end of said truck, all as described in the following.

Suitably bolted, as at 28, in upright positions, at opposite sides of the chassis frame 10, on a front end bar 29 of said cassis frame and extending forwardly of said bar 29 is a pair of hanger brackets 30 provided with a lower, front edge V-notch 31 with an apex socket 32 similar to the sockets 12. Each hanger bracket 30 comprises a pair of spaced apart side plates 33 with vertical spacing bars 34 therebetween and connecting cross rods 35. A downwardly and forwardly inclined pick-up bar 36 extends out of each hanger bracket 30, from between the side plates 33, below the socket 32 with the upper edge of said pick-up bar parallel with the lower edges of the V-notch 31, said pick-up bar 36 being secured in place by one of the cross rods 35. The pick-up bars 36 flare outwardly, relatively, from the hanger brackets 30 for a purpose presently apparent.

An upstanding latch dog 37, for a purpose presently explained, is vertically slidable in a guideway 38 in each hanger bracket 30 and normally rests at its lower end on the pick-up bar 36 and in the V-notch 31 in front of the socket 32 and whereby said dog closes said socket and is held by the pick-up bar 36 in latching position. The lower end of the latch dog 37 is beveled, as at 39, for camming of said latch dog 37 upwardly, by means presently described, to open the socket 32 and move said dog into unlatching position. A hand lever 40, on the before-mentioned pivot 21 is operatively connected to both latch dogs 37 for manually sliding said dogs upwardly into unlatching position and by means of a pivoted rod 41 on said hand lever 40 pivoted, as at 42, to one end of a Y-shaped lever 43 fast on one end of a rock shaft 44 journaled transversely through the hanger brackets 30 and having a V-shaped lever 45 fast on its other end. The levers 43, 45 underlie lateral studs 46 on the latch dogs 37 working in vertical slots 47 in said hanger brackets 30. By swinging the hand lever 40 rearwardly from the position shown in the drawings, the rock shaft 44 is rocked in one direction to swing said levers 43, 45 clockwise, as shown in the drawings, to lift the latch dogs 37 above the sockets 32 and into unlatching socket opening position. The weight of the latch dogs 37 overbalances the described operating connections therefor whereby said dogs normally gravitate into latching, socket closing position and in this position of said dogs 37 a stop arm 48 on said lever 43 engages the frame bar 29 and establishes the normal position of the operating connections.

The means on the front end of the pusher bars 3 with which the described means on the front end of the truck 6 coacts comprises a pair of side plates 50 suitably fixed to and rising from said bars 3 immediately in the rear of the moldboard 2, and from which brace bars 51 extend forwardly to said moldboard. A transverse pick-up and pusher shaft 52 is carried by said plates 50 in upwardly and rearwardly inclined slots 53 in said plates and normally gravitate to the lower ends of said slots 53 in which position it is above the lower ends of the pick-up bars 36, that is if the plow 1 is grounded and together with the truck 6 is on substantially level ground. Collars 54 on said shaft 52 engaging said plates 50 prevent end play of said shaft 52 in the inclined slots 53. The plates 50 are spaced apart to enter between the pick-up bars 36 and between the hanger brackets 30 and the ends of said shaft 32 extend outwardly of said plates 50 for engagement by the pick-up bars 30.

Referring now to the operation of my invention, as so far described. To pick-up and couple plow 1 to the pusher truck 6, the hand lever 40 is swung into the full line position shown in the drawings to swing the pick-up bars 13 into downwardly and forwardly inclined pick-up position with the beveled edges 14 thereof riding the ground. The pusher truck is then driven forwardly over the pusher bars 30, as shown in Figure 1, until said pick-up bars 13 engage the trunnion ends 26 of the cross pusher rod 25, pick-up said trunnion ends and cam the same upwardly to pass through the V-notches 11 into the sockets 12 whereby to couple the rear ends of said bars 3, and hence the rear end of the snow plow 1, to said truck 6 in suspended position on the hanger bracket plates 8. As the trunnion ends 26 enter the sockets 12, said ends are positioned rearwardly of the pivots 15 of the pick-up bars 13 and by engagement with said bars 13 swing the same upwardly out of ground engaging position into substantially horizontal position, as shown in Figure 4, such swinging of said bars 13 rocking the cranks 16 to rock the shaft 17 and hand lever 20 and swing said lever into the normal position shown in Figure 4.

Simultaneously with picking up and coupling of the rear ends of the pusher bars 3, and hence the rear end of the snow plow 1, to the hanger bracket plates 8, as described in the preceding paragraph, the pick-up bars 36 engage and pick-up the ends of the pick-up and pusher shaft 52 causing the same to ride up said bars 36 through the V-notches 31 into the sockets 32, thus coupling the front ends of the pusher bars 3, and hence the front end of the snow plow 1, to the front end of the chassis frame 10. Before the ends of the pick-up and pusher shaft 52 enter the sockets 32, said ends engage the beveled lower cam ends 39 of the latch dogs 37 and cam said dogs upwardly by wiping past the same, thereby moving said latch dogs into unlatching socket opening position to descend into latching socket closing position in front of said shaft 52 after the ends of said shaft have entered the sockets 32. During these operations of the latch dogs 37, the levers 43, 45, rock shaft 44, rod 41 and hand lever 40 remain in normal position shown in full line in the drawings. As the pick-up and pusher shaft 52 is picked up, it rides upwardly and rearwardly in the slots 53 to the upper ends thereof without picking up the front end of the snow plow 1. This idle movement of the pick-up and pusher shaft 52 serves a purpose presently seen.

The snow plow 1, when coupled as described may be pushed at its front and rear ends by the hanger bracket plates 8 working against the cross shaft 25, and by the hanger brackets 30 working against the pick-up and pusher shaft 52.

To uncouple the snow plow 1, the hand lever 40 is swung from normal position to lift the latch dogs 37 into unlatching socket opening position, in the manner already described, and the pusher truck 6 is then backed relative to the snow plow 1, whereupon the trunnion ends 26 of the cross rod 25 will slide forwardly down the pick-up bars 13 out of the sockets 12 and V-notches 11, said bars 13 swinging downwardly into ground engaging position under the weight thereon to ease the rear ends of the pusher bars 3 and the rear end of the snow plow 1 onto the ground. At the same time, the pick-up and pusher shaft 52 will slide forwardly out of the sockets 32 and V-notches 31 down the pick-up bars 36 to ease the front end of the snow plow 1 onto the ground, if lifted off the ground. If the snow plow 1 is not lifted, at its front end, off of the ground, the pick-up and pusher shaft 52 will slide down the pick-up bars 36 idly in the inclined slots 53. If the hand lever 40 is then released, the latch dogs 37 will gravitate into normal latching and socket closing position and the operating connections therefor will be moved back into normal position therewith in a manner which will be clear.

For lifting the front end of the snow plow 1, while coupled, as occasion may require, power lift means is provided as follows. A power lift cylinder 60 is mounted by a bracket plate 61 on the front chassis frame bar 29 in the center of and forwardly of said bar with an upright piston rod 62 pivoted at its upper end, as at 63, to an intermediate portion of a forwardly extending lift lever 64 pivoted at its rear end, as at 65, on an arm 66 upstanding from and fixed on said front bar 29.

An inverted U-shaped lifting yoke 67, between the plates 50, is pivoted at its sides, in upright position, as at 68, to upper and lower links 69 of parallel pairs pivoted, as at 70, to said plates 50, said links 69 supporting said yoke 67 for vertical swinging movement in a vertical position. Upper and lower stops 71, 72 on each plate 50 engaged by the lower links 69 limit upward and downward swinging of said yoke 67 relative to the plates 50. When the snow plow 1 is coupled to the pusher truck 6 with the piston rod 62 in its downward limit of movement and the lift lever 64 correspondingly lowered, as shown in Figures 1 and 4 of the drawings, the lifting yoke 67 overlies the front end of the lift lever 64 for lifting by said lever 64 when the piston rod 62 and lifting lever 64 are moved upwardly, as by fluid pressure admitted to said cylinder 60 by any suitable means, not shown. In this connection, it is to be noted that the slots 53 are substantially concentric to the axis of the cross pusher rod 25 and the sockets 12 so that plates 50 and the front end of the snow plow 1 are swingable upwardly, with the trunnion ends 26 of said rod 25 rotating in the sockets 12, when the snow plow is coupled as described. It is furthermore to be noted that if the piston rod 62 and lifting lever 64 are lowered to the position shown in Figures 1 and 4, as by evacuating pressure from said cylinder 60, by suitable means not shown, the lifting yoke 67 will gravitate downwardly against the coupling and pusher shaft 52, as best shown in Figure 6 and lock said shaft 52 in the upper ends of the slots 53 in a raised position in line with the notches 30 for a subsequent coupling operation.

In Figure 11, the position of the power lift means is shown in lifting the front end of the snow plow 1 off the ground, and as shown in the figure, upward lifting of the front end of the snow plow 1 is limited by engagement of the piston rod 62 with the rock shaft 44, as a safety provision.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described my invention, what is claimed as new is:

1. In combination, a moldboard snow plow including a pair of laterally spaced pusher bars extending rearwardly from moldboard and adapted to lie on the ground when said plow is not in use, a pusher truck for said plow having a chassis frame and front side wheels and adapted to be driven forwardly along said pusher bars toward said moldboard with said wheels straddling the bars of said pair, a transverse pusher rod connecting said pusher bars adjacent the rear ends thereof, and means on said chassis frame coacting with said rod during such forward driving of said truck to pick-up and couple said rear ends of said pusher bars to opposite sides of said chassis frame in suspended position comprising a pair of hanger bracket plates depending from opposite sides of said chassis frame and having forwardly opening sockets therein, and a pair of pick-up bars pivoted on said plates for swinging into downwardly and forwardly extending ground engaging position to engage and lift said rod into position to enter said sockets.

2. In combination, a moldboard snow plow including a pair of laterally spaced pusher bars extending rearwardly from said moldboard and adapted to lie on the ground when said plow is not in use, a pusher truck for said plow having a chassis frame and front side wheels and adapted to be driven forwardly along said pusher bars toward said moldboard with said wheels straddling the bars of said pair, a transverse pusher rod connecting said pusher bars adjacent the rear ends thereof, and means on said chassis frame coacting with said rod during such forward driving of said truck to pick-up and couple said rear ends of said pusher bars to opposite sides of said chassis frame in suspended position comprising a pair of hanger bracket plates depending from opposite sides of said chassis frame and having forwardly opening sockets therein, a pair of pick-up bars pivoted on said plates for swinging into downwardly and forwardly extending ground engaging position to engage and lift said rod into position to enter said sockets, a hand lever pivoted on one side of said chassis frame, and means operative by said lever for swinging said pick-up bars in unison into and from ground engaging position at will.

3. In combination, a moldboard snow plow including a pair of laterally spaced pusher bars extending rearwardly from said moldboard and adapted to lie on the ground when said plow is not in use, a pusher truck for said plow having a chassis frame and front side wheels and adapted to be driven forwardly along said pusher bars toward said moldboard with said wheels straddling the bars of said pair, a transverse pusher rod connecting said pusher bars adjacent the rear ends thereof, and means on said chassis frame coacting with said rod during such forward driving of said truck to pick-up and couple said rear ends of said pusher bars to opposite sides of said chassis frame in suspended position comprising a pair of hanger bracket plates depending from opposite sides of said chassis frame and having forwardly opening sockets therein, a pair of pick-up bars pivoted on said plates for swinging into downwardly and forwardly extending ground engaging position to engage and lift said rod into position to enter said sockets, a hand lever pivoted on one side of said chassis frame, and means operative by said lever for swinging said pick-up bars in unison into and from ground engaging position at will including a rock shaft journaled in said plates, cranks on opposite ends of said rock shaft operatively connected to said pick-up bars, and a connection between said lever and one of said cranks.

4. In combination, a moldboard snow plow including a pair of laterally spaced pusher bars extending rearwardly from said moldboard and adapted to lie on the ground when said plow is not in use, a pusher truck for said plow having a chassis frame and front side wheels and adapted to be driven forwardly along said pusher bars toward said moldboard with said wheels straddling the bars of said pair, a transverse pusher rod connecting said pusher bars adjacent the rear ends thereof, and means on said chassis frame coating with said rod during such forward driving of said truck to pick-up and couple said rear ends of said pusher bars to opposite sides of said chassis frame in suspended position comprising a pair of hanger bracket plates depending from opposite sides of said chassis frame and having forwardly opening sockets therein, and a pair of pick-up bars pivoted on said plates for swinging into downwardly and forwardly extending ground engaging position to engage and lift said rod into position to enter said sockets, said rod when entering said sockets engaging said pick-up bars and swinging the same from ground engaging position.

FREDERICK H. GJESDAHL.

References Cited in the file of this patent

UNITED STATES PATENTS

| Number | Name | Date |
|---|---|---|
| 1,686,243 | Meyer | Oct. 2, 1928 |
| 1,867,186 | Soule et al. | July 12, 1932 |
| 2,094,515 | Abbe | Sept. 28, 1937 |
| 2,160,702 | Le Bleu | May 30, 1939 |
| 2,231,875 | Behnke et al. | Feb. 18, 1941 |
| 2,307,655 | Arps | Jan. 5, 1943 |
| 2,346,330 | Ratcliff | Apr. 11, 1944 |
| 2,365,597 | Roth | Dec. 19, 1944 |
| 2,401,183 | Pool et al. | May 28, 1946 |